United States Patent
Maskaliunas

(10) Patent No.: US 9,103,446 B2
(45) Date of Patent: Aug. 11, 2015

(54) FLUID SEAL ASSEMBLY

(75) Inventor: Linas L. Maskaliunas, Geneva, IL (US)

(73) Assignee: AKTIEBOLAGET SKF, Gothenburg (SE)

( * ) Notice: Subject to any disclaimer, the term of this patent is extended or adjusted under 35 U.S.C. 154(b) by 1008 days.

(21) Appl. No.: 12/882,732

(22) Filed: Sep. 15, 2010

(65) Prior Publication Data

US 2012/0061921 A1    Mar. 15, 2012

(51) Int. Cl.
   *F16J 15/32*    (2006.01)
(52) U.S. Cl.
   CPC .................................. F16J 15/3244 (2013.01)
(58) Field of Classification Search
   CPC .................................................. F16J 15/3244
   USPC ........................... 277/353, 551, 559, 569, 575
   See application file for complete search history.

(56) References Cited

U.S. PATENT DOCUMENTS

| | | | |
|---|---|---|---|
| 3,738,667 A | 6/1973 | Symons | |
| 3,929,340 A | 12/1975 | Peisker | |
| 3,930,655 A * | 1/1976 | Fern | 277/559 |
| 4,171,561 A * | 10/1979 | Bainard et al. | 29/527.1 |
| 4,288,083 A * | 9/1981 | Braconier | 277/559 |
| 4,336,945 A | 6/1982 | Christiansen et al. | |
| 4,399,998 A * | 8/1983 | Otto | 277/552 |
| 4,501,431 A | 2/1985 | Peisker et al. | |
| 4,531,748 A | 7/1985 | Jackowski | |
| 4,667,968 A | 5/1987 | Nash et al. | |
| 4,886,281 A | 12/1989 | Ehrmann et al. | |
| 4,969,653 A * | 11/1990 | Breen | 277/561 |
| 5,791,658 A * | 8/1998 | Johnston | 277/559 |
| 5,921,555 A * | 7/1999 | Johnston | 277/559 |
| 6,213,476 B1 | 4/2001 | Chandler et al. | |
| 6,409,177 B1 | 6/2002 | Johnston | |
| 6,620,361 B1 | 9/2003 | Longtin et al. | |
| 6,736,404 B1 | 5/2004 | Shuster | |
| 2006/0071430 A1* | 4/2006 | Downes et al. | 277/549 |
| 2007/0132194 A1* | 6/2007 | Kanda | 277/559 |
| 2008/0258406 A1* | 10/2008 | Dahlheimer | 277/569 |
| 2008/0284110 A1* | 11/2008 | Dahlheimer | 277/551 |

FOREIGN PATENT DOCUMENTS

| | | | |
|---|---|---|---|
| EP | 352118 A1 * | 1/1990 | |
| GB | 2240592 A * | 8/1991 | |

* cited by examiner

*Primary Examiner* — Vishal Patel
*Assistant Examiner* — Stacy Warren
(74) *Attorney, Agent, or Firm* — Mark Ussai; SKF USA Inc. Patent Dept.

(57) ABSTRACT

A fluid seal assembly is disposable between an outer surface, i.e. engine block or any other part that requires application of the assembly and a rotatable member, such as, for example a shaft, wherein the assembly circumscribes the shaft and lubricates the shaft and the same rotates around the axis. The assembly includes at least three members: a casing unit, a sealing ring unit, and a liner. The assembly eliminates problems associated with prior art designs such as static leakage of oil, and clogging up the spirals with carbonized oil that negatively impact lifecycle of the fluid seals.

5 Claims, 2 Drawing Sheets

FLUID SEAL ASSEMBLY

FIELD OF THE INVENTION

The present invention relates generally to fluid seals for use with relatively rotatable members, such as shafts and the like.

BACKGROUND OF THE INVENTION

Fluid seals assemblies of various types are used in numerous applications including and not limited to sealing vehicular engine crankshafts, transmission shafts, bearing lubrication systems, compressor shaft support assemblies, and the like. The fluid seal assembly is designed to retain and seal oil or grease in a predetermined location for lubricating the shaft and to prevent ingress of environmental contaminants.

Typical fluid seal assembly includes a casing unit, a flexible sealing member having a sealing lip adapted to engage against a sealing surface of a relatively rotatable member, such as the shaft. The flexible sealing member includes a body portion extending to an annular flex portion of reduced cross-sectional thickness bonded to the metal case member and located intermediate the seal lip and metal case. The purpose of this flex section is to allow the seal lip to stay in continuous, intimate contact with the shaft it is to seal despite any lack of concentricity between the relatively rotating members, e.g. the rotating shaft and the stationery engine block into which the annular metal case member is installed.

It is important to constantly retain and seal oil or grease in a predetermined location for lubrication of the shaft and to prevent ingress of environmental contaminants. There are numerous prior art seal assembly designs, which are effective to return oil or other lubricant to the sealed cavity upon rotation of the shaft. In either case, relative motion between the shaft and the seal assembly serves to "pump" the oil, grease, or other sealed fluid back into the sealed region defined between the shaft and the seal assembly.

The art is replete with various prior art references related to numerous seal designed to be adaptable to retain and seal oil or grease in a predetermined location for lubrication the shaft. These prior art references include and are not limited to U.S. Pat. No. 3,929,340 to Peisker; U.S. Pat. No. 4,336,945 to Christiansen, et al.; U.S. Pat. No. 4,501,431 to Peisker et al., U.S. Pat. No. 4,667,968 to Nash et al., U.S. Pat. No. 4,886,281 to Ehrmann et al.; U.S. Pat. No. 4,969,653 to Breen, U.S. Pat. No. 6,213,476 to Chandler et al., U.S. Pat. No. 6,620,361 to Longtin et al., and U.S. Pat. No. 6,736,404 to Shuster.

The U.S. Pat. No. 4,336,945 to Christiansen, et al. teaches a seal assembly for creating a fluid seal between first and second, relatively movable elements, at least one of which is arranged for rotation about an axis. The seal has a mounting portion thereof adapted to be fixedly associated in use with said first element, a dirt exclusion portion and an oil retention portion. The dirt exclusion portion has a plurality of annular excluder lips, and the excluder lips, as manufactured, extend radially inwardly and are spaced axially apart from each other. The lips also have an inside diameter substantially smaller than that of said second relatively movable element, and the excluder lips, in position of use, contact and lie along the second element, as installed, the lips are flexed so that the inner portions thereof extend radially inwardly as well as axially away from the region to be sealed.

The seal assembly taught by the U.S. Pat. No. 4,336,945 to Christiansen, et al. has several problems. The hydrodynamic features, such as spirals, are formed into the wafer portion of the seal, which contacts with the countersurface, i.e. the rotatable shaft. The location of the spirals or grooves results in clogging of these spirals or grooves with carbonized oil thereby reducing the lifespan of the seal assembly. Another problem is static leakage of oil through these spirals or grooves. Still another major problem associated with the seal assembly is a constant frictional engagement between the lip portion and one of the elements, the rotatable shaft rotatable about the axis. Due to wear and tear of the lip portion resulting from this constant frictional engagement, the seal assembly needs to be replaced.

The U.S. Pat. No. 6,620,361 to Longtin et al. discloses another design of the seal assembly that was intended to solve the problems associated with the prior art design, such as, for example, the seal assembly taught by U.S. Pat. No. 4,336,945 to Christiansen, et al. The U.S. Pat. No. 6,620,361 to Longtin et al. teaches a lip-type fluid seal assembly having a rigid annular case or carrier, a fluid seal having an annular sealing member carried by the case. The sealing member is made of any suitable elastomeric material. The sealing member has an annular body portion fixed to the flange of the case, and an annular flex section extending radially outwardly from the body portion at an axially outward inclination, terminating in an annular lip providing a sealing lip edge.

The U.S. Pat. No. 6,620,361 to Longtin et al. further discloses a non-elastic insert formed of PTFE material which is relatively harder than the material of the sealing member. The insert has an annular lip providing a sealing lip edge. The elastomeric and PTFE lip edges are adapted to sealingly engage a cylindrical sealing surface of a rotatable member. Together the lip of the sealing member and the lip of the insert provide an annular sealing lip of composite construction. The composite sealing lip is intended to protect against contaminants such as dust, dirt, sand, road grime, salt, water, etc. from entering the fluid side. The elastomeric lip may solve a problem of wear and tear of the sealing lip resulting from constant frictional engagement with the rotatable member, it fails to teach any features that provide bidirectional hydrodynamic functions.

Hence, there is a need for an improved fluid seals and methods to eliminate problems associated with prior art designs such as static leakage of oil, clogging up the seals with carbonized oil, constant wear and tear and replacement of parts that negatively impact lifecycle of the fluid seals. The inventive concept as set forth further below improves the aforementioned prior art systems and methods.

SUMMARY OF THE INVENTION

A fluid seals assembly (the assembly) of the present invention has numerous applications including and not limited to sealing vehicular engine crankshafts, transmission shafts, bearing lubrication systems, compressor shaft support assemblies, and the like. The assembly is disposed between an outer surface, i.e. a housing or an engine block or any other part that requires application of the assembly and a rotatable member, such as, for example a shaft, wherein the assembly circumscribes the shaft and lubricated the shaft as the same rotates around the axis. The assembly includes a casing unit and a sealing ring unit. The casing unit presents a rigid member having a side wall and a flange radially extending from the side wall. The side wall terminates into a free end.

The sealing ring unit is secured to the flange of the casing unit through the collar member. The collar member includes a neck portion defined by an upper lip and a lower lip defining a nest or a void therebetween to sandwich the flange. The sealing ring unit further includes a seal sleeve. The seal sleeve includes a body having a spring retention groove to retain a spring and a plurality of converging walls. The wall further extends to a lip edge.

A bidirectional hydrodynamic feature, i.e. a liner, is connected to the seal sleeve. The liner is molded and connected to the walls of the seal sleeve. The liner presents a first wall, a second wall extending generally perpendicular from the first wall, and a peripheral face extending from the second wall. The second wall presents a pumping surface. The pumping surface presents a sinuous line thereby forming waves along the surface.

As the assembly receives a shaft, the seal sleeve engages the shaft thereby flexing the body to a position whereby the second wall presenting the pumping surface moves to a plane with the pumping surface extending generally perpendicular to the axis of the shaft. This bidirectional hydrodynamic feature allows for constant lubrication of the shaft thereby preventing static leakage of oil that negatively impact lifecycle of the fluid seals.

An advantage of the present invention is to provide a fluid seal assembly that includes a seal sleeve that presenting a bidirectional hydrodynamic liner formed from durable polymeric material and presenting a pumping surface to provide pumping feature and to prevent wear and tear of the seal sleeve as the same rotates relative the shaft thereby increasing lifespan of the assembly.

Another advantage of the present invention is to provide an improved fluid seal assembly that eliminated problems associated with prior art designs such as static leakage of oil, clogging up the spirals with carbonized oil that negatively impact lifecycle of the fluid seals.

Still another advantage of the present invention is to provide the fluid seal assembly that presents the seal sleeve having no direct contact with the countersurface, i.e. a rotatable shaft thereby increasing the lifecycle of the fuel seal assembly.

Still another advantage of the present invention is to provide the fluid seal assembly that is cost effective in manufacturing.

Still another advantage of the present invention is to provide the fluid seal assembly that replaces prior art designs of the fluid seals having hydrodynamic features, such as unidirectional or bi-directional spirals, being cut or formed into the wafer portion of the seal which contacts with the rotatable shaft, thereby clogging these spirals with carbonized oil, which leads to reduction of the lifespan of the fluid seal assembly.

Other advantages and meritorious features of this invention will be more fully understood from the following description of the preferred embodiment, the appended claims, and the drawings; a brief description of which follows.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1:
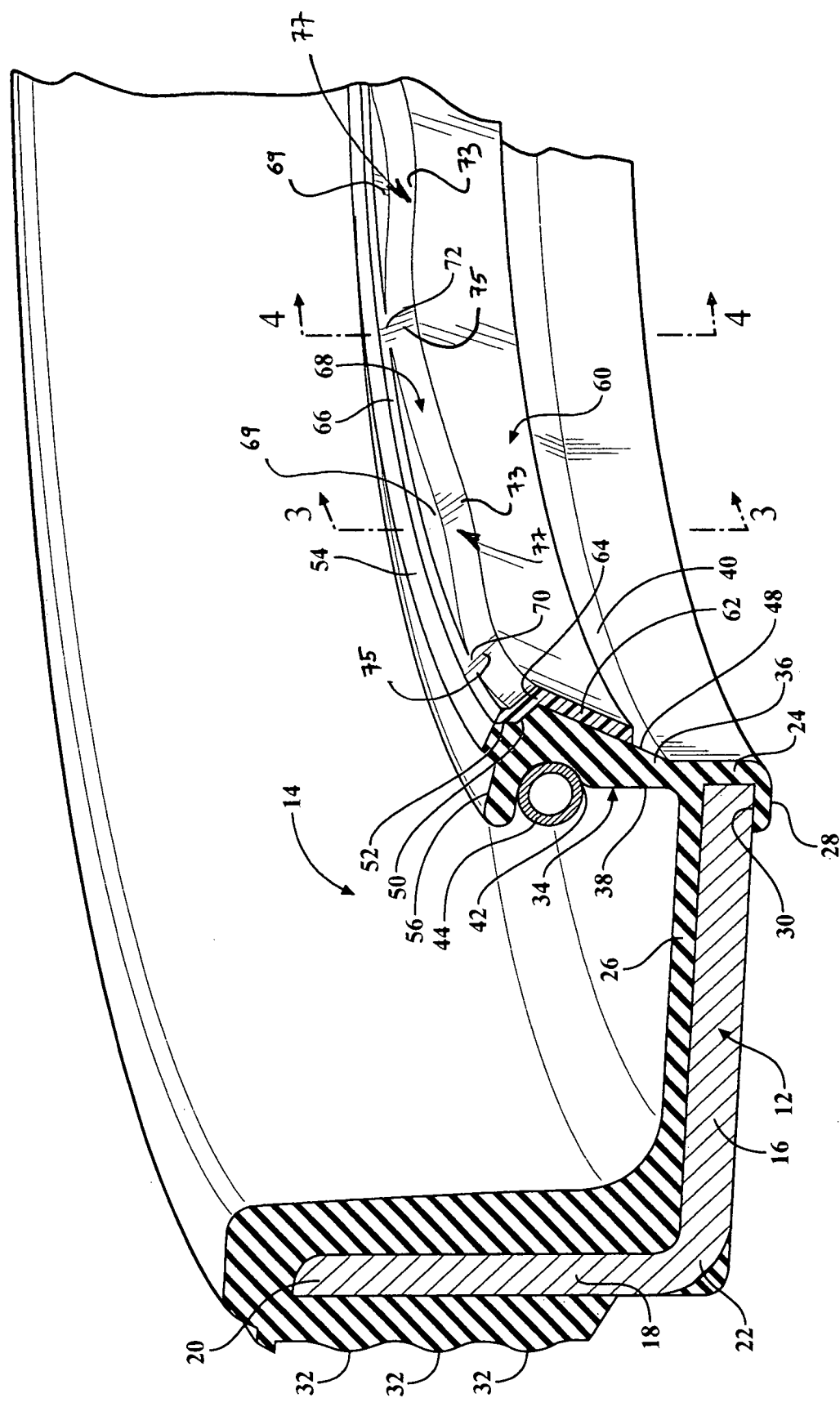
FIG. 1 illustrates a partial cross sectional view of a seal assembly (the assembly) illustrating a seal sleeve and a bidirectional hydrodynamic liner presenting a pumping surface.
Figure 2:
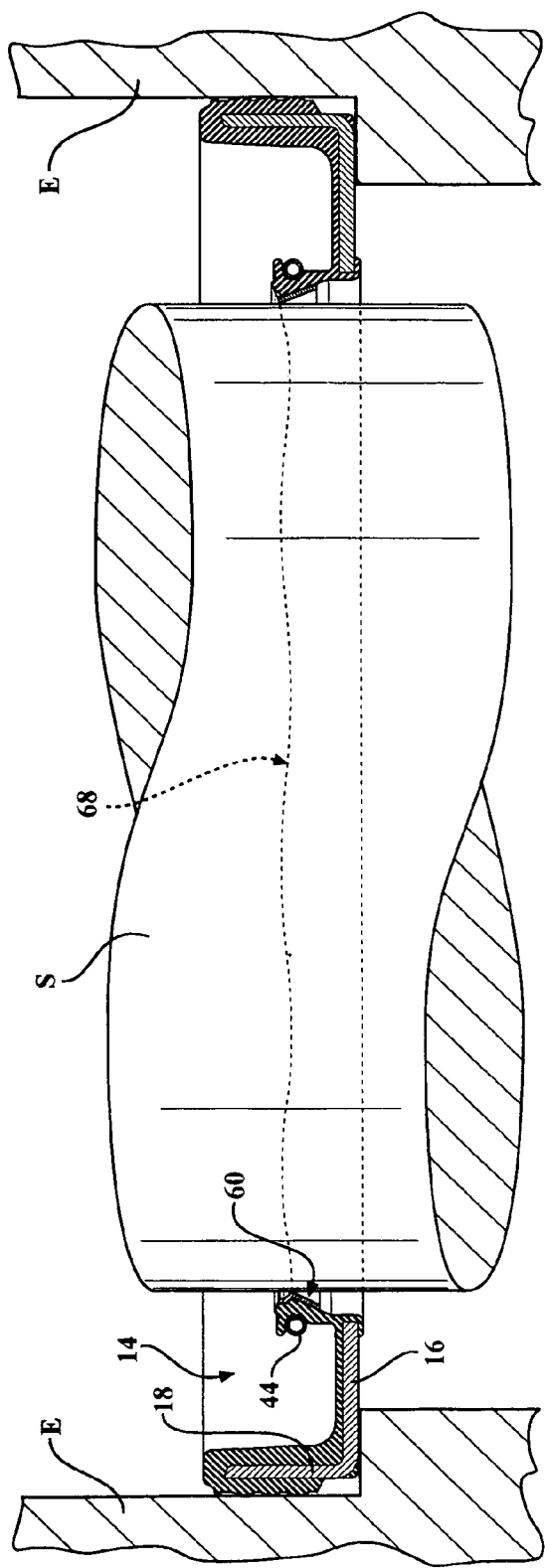
FIG. 2 illustrates a cross sectional view of the assembly circumscribing a shaft and disposed between the shaft and a countersurface.

Referring to the Figure, wherein like numerals indicate like or corresponding parts throughout the several views, a fluid seal assembly (the assembly) of the present invention is generally shown at 10 FIGS. 1 through 4. The assembly 10 has numerous applications including and not limited to sealing vehicular engine crankshafts, transmission shafts, bearing lubrication systems, compressor shaft support assemblies, and the like, without limiting the scope of the present invention. FIG. 2, for example, illustrates an environment, wherein the assembly is disposed between a counterpart, such as a shaft S and a surface, such as an engine wall E or a housing of the kind. Those skilled in the mechanical art will appreciate that the shaft S and the engine wall 14 are shown for exemplary purposes only and are not intended to limit the scope of the present invention.

Referring back to FIG. 1, a partial cross sectional view of the assembly 10. The assembly 10 includes a casing unit, generally indicated at 12 and a sealing ring unit, generally indicated at 14. The casing unit 12 presents a rigid member having a side wall 16 presenting a bonding portion and a flange portion 18 extending outwardly from the side wall 16. The flange portion 18 terminates into a free end 20. The flange portion 18 and the side wall 16 present a radius portion 22 defined therebetween. The sealing ring unit 14 is secured to the flange portion 18 of the casing unit 12 through a collar member 24. The collar member 24 includes a neck portion defined by an upper lip or inner bonding portion 26 and a lower lip or outer bonding portion 28 defining a nest 30 or a void therebetween to sandwich the side wall 16. The inner bonding portion 26 further extends along the side wall 16 and the flange portion 18 thereby encapsulating at least the flange portion 18 forming a plurality of circumferential ribs 32.

The sealing ring unit 14 further includes a seal sleeve, generally indicated at 34. The seal sleeve 34 includes a body 36 presenting a reverse surface 38 and an active surface 40. A spring retention groove 42 is formed in the reserve surface 38 to retain a spring 44 thereby applying external pressure to the seal sleeve 34 circumscribing the shaft S. A plurality of converging walls 46, 48, 50, 52, and 54 are defined in the active surface 40 of the seal sleeve 34. The wall 54 forming a peripheral face of the seal sleeve 34 further extends to a lip edge 56 extending over the spring 44 retained in the spring retention groove 42. The seal sleeve 34 is formed from any suitable elastomeric materials, such as rubber, silicone, polyacrylic, fluoroelastomer, ethylene acrylic, hydrogenated nitrile or nitrile elastomer. The sleeve 44 may also be formed from other materials such as, for example, polytetrafluoroethylene (PTFE) without limiting the scope of the present invention. The seal sleeve 34 is injection molded but may be formed by many other suitable methods without limiting the scope of the present invention.

Figure 3:
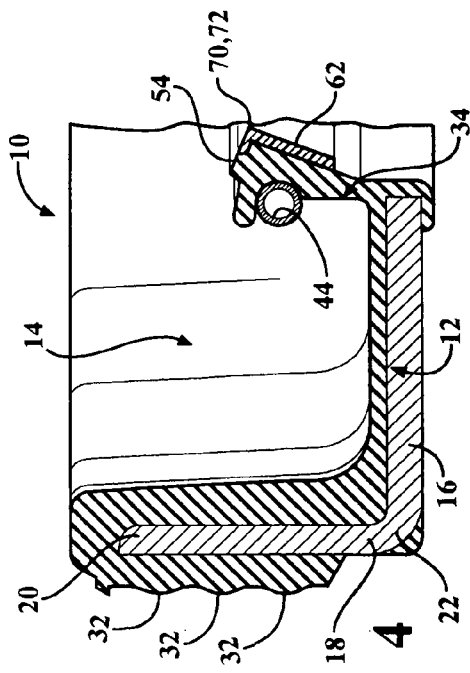
FIG. 3 illustrates a partial cross sectional view of the assembly of FIG. 1 taken along lines 3-3 showing a bottom point of the pumping surface defined on the bidirectional hydrodynamic liner.
Figure 4:
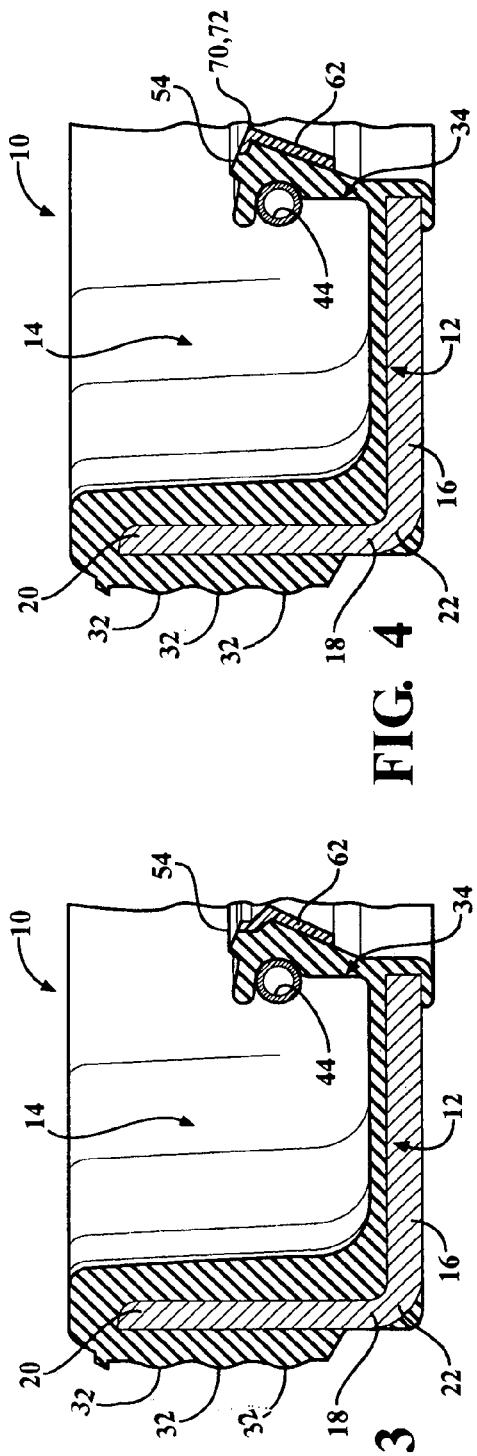
FIG. 4 illustrates a partial cross sectional view of the assembly of FIG. 1 taken along lines 4-4 showing an upper point of the pumping surface defined on the bidirectional hydrodynamic liner.

As best shown in FIGS. 1, 3 and 4, a bidirectional hydrodynamic element, i.e. a liner of the sealing ring unit 14, is generally indicated at 60. The liner 60 is molded and connected to the walls 48, 50, 52 forming a seat to fusible receive the liner 60. The liner 60 presents a first wall 62, a second wall 64 extending generally perpendicular from the first wall 62, and a third wall 52 extending generally perpendicular from the second wall 64. The third wall 52 having a peripheral face 66. The second wall 62 presents a pumping surface generally indicated at 68. The pumping surface 68 presents a sinuous line thereby forming waves along the surface 68. The liner 60 may be fabricated by injection molded but may be formed by many other suitable methods without limiting the scope of the present invention. For example, the liner 60 is typically created by scribing it from a compression formed billet that has been sintered. The liner 60 could also be formed via direct injection without limiting the scope of the present invention. The liner 60 may be molded into the seal sleeve 34 after the seal sleeve 34 is formed and before the seal sleeve 34 is removed from a mold (not shown). As best shown in FIG. 1, the peripheral face 66 further includes spaced walls 69 extending below the peripheral face 66 thereby connecting the peripheral face 66 with the second wall 64. The pumping surface 68 further includes nadir points 73 spaced by flat portions 75. The flat portions 75 are aligned with spaced locations 72 of the peripheral face 66 thereby forming a plurality of concave segments, generally indicated at 77, of the peripheral face 66, which are separated by flat portions 75 with the plurality of the spaced walls 69 defined therebetween. Alternatively, the liner 60 may be bonded, fusible connected, or joined to the seal sleeve 34 by any suitable methods without limiting the scope of the present invention.

As best shown in FIGS. 1, 3, and 4, the pumping surface 68 extends generally parallel to the peripheral face 54 at the spaced location (only several of the spaced locations are shown at 70 and 72 in FIG. 1) along the circumference of the liner 60. The pumping surface 68 further extends generally below the peripheral face 54 between the spaced locations 70 and 72 thereby forming the waves along the pumping surface 68 thereby continuously lubricating the shaft S as lubricant circulates about the waves along the pumping surface 68. The liner 60 solves a problem of wear and tear of the seal sleeve resulting from constant frictional engagement with the rotatable shaft S thereby increasing the lifecycle of the fuel seal assembly 10.

The assembly 10 of the present invention includes numerous advantages over the prior art references including and not limited to U.S. Pat. No. 4,501,431 to Peisker et al., U.S. Pat. No. 4,667,968 to Nash et al., U.S. Pat. No. 4,969,653 to Breen, U.S. Pat. No. 6,213,476 to Chandler et al., U.S. Pat. No. 6,620,361 to Longtin et al., and U.S. Pat. No. 6,736,404 to Shuster. The assembly 10 eliminates problems associated with prior art designs such as static leakage of oil, clogging up the spirals with carbonized oil that negatively impact lifecycle of the fluid seals. The assembly 10 provides the fluid seal design that presents the sealing face having no direct contact with the countersurface, i.e. a rotatable shaft S thereby increasing the lifecycle of the assembly 10.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A seal assembly for providing a seal between a cylindrical member and a surrounding housing with the cylindrical member rotatable around a central axis and relative the surrounding housing, said seal assembly comprising:
   a casing unit defined by a side wall and a flange extending axially from said side wall;
   a seal sleeve secured to said flange and presenting an active surface surrounding the cylindrical member; and
   a liner including a first wall, a sinuous second wall extending radially outwardly and generally perpendicular from said first wall, and a third wall extending at an obtuse angle from said second wall and generally parallel to a longitudinal axis of the seal assembly, said liner being bonded to said active surface to form a pumping surface presented by nadir points of said second wall, said second wall and said third wall forming a flat distal surface at each said nadir point, and said nadir points separated by spaced walls segments of said third wall thereby forming a plurality of concave segments of said pumping surface, for lubricating the cylindrical member and preventing frictional engagement between said seal sleeve and the cylindrical member.

2. A seal assembly as set forth in claim 1, wherein said pumping surface extends generally parallel to a peripheral face of said third wall at spaced locations along the circumference of said liner to continuously lubricate the cylindrical member as lubricant circulates about waves along said pumping surface.

3. A seal assembly as set forth in claim 2, wherein said liner is formed from at least one of silicone, polyacrylic, fluoroelastomer, ethylene acrylic, and polytetrafluoroethylene.

4. A method of forming a seal assembly to provide a seal between a cylindrical member and a surrounding housing with the cylindrical member rotatable around a central axis and relative the surrounding housing, said method comprising the steps of:
   forming a casing unit defined by a side wall and a flange extending axially from the side wall;
   forming a seal sleeve to be secured to the flange and presenting an active surface surrounding the cylindrical member;
   forming a liner including a first wall, a sinuous second wall extending radially outwardly and generally perpendicular from the first wall, and a third wall extending at an obtuse angle from the second wall and generally parallel to a longitudinal axis of the seal assembly; and
   connecting the liner to the active surface to form a pumping surface presented by nadir points of the second wall, the second wall and the third wall forming a flat distal surface at each nadir point, and the nadir points separated by spaced walls segments of the third wall thereby forming a plurality of concave segments to form the pumping surface to lubricate the cylindrical member and to prevent frictional engagement between the seal sleeve and the cylindrical member.

5. A method as set forth in claim 4, further including the step of fabricating the liner from at least one of rubber, polyacrylic, fluoroelastomer, ethylene acrylic, silicone, and polytetrafluoroethylene.

* * * * *